United States Patent [19]
Yamamura et al.

[11] Patent Number: 5,741,369
[45] Date of Patent: Apr. 21, 1998

[54] PLATE-LIKE BODY STRUCTURE WITH SOLAR BATTERY FOR SOUND INSULATION WALL

[75] Inventors: Shinta Yamamura, Kanagawa; Naoyuki Furuta; Tadanori Mizukami, both of Tokyo; Yutaka Tazaki, Kanagawa; Takashi Mikami, Saitama, all of Japan

[73] Assignee: Nitto Boseki Co., Ltd., Fukushima, Japan

[21] Appl. No.: 654,345

[22] Filed: May 28, 1996

[30] Foreign Application Priority Data

May 30, 1995 [JP] Japan ................................. 7-154058

[51] Int. Cl.$^6$ ............................. H01L 31/048; E01F 8/00
[52] U.S. Cl. ...................... 136/251; 136/291; 181/210; 181/211; 181/284
[58] Field of Search ............................ 136/251, 291; 181/210–211, 284, 290

[56] References Cited

U.S. PATENT DOCUMENTS

| | | | |
|---|---|---|---|
| 4,139,399 | 2/1979 | Lindmayer | 136/251 |
| 4,582,953 | 4/1986 | Nagase et al. | 136/259 |
| 4,605,813 | 8/1986 | Takeuchi et al. | 136/244 |
| 5,128,181 | 7/1992 | Kunert | 428/34 |
| 5,213,627 | 5/1993 | Marquardt et al. | 136/251 |
| 5,329,073 | 7/1994 | Shono et al. | 181/210 |
| 5,619,829 | 4/1997 | Tan et al. | 52/293.3 |

FOREIGN PATENT DOCUMENTS

| | | | |
|---|---|---|---|
| 4219075 | 12/1993 | Germany. | |
| 9318768.8 | 5/1994 | Germany. | |
| 08-120625 | 5/1996 | Japan. | |
| 683730 A5 | 4/1994 | Switzerland | 136/251 |

*Primary Examiner*—Aaron Weisstuch
*Attorney, Agent, or Firm*—Sixbey, Friedman, Leedom & Ferguson, P.C.; Gerald J. Ferguson, Jr.

[57] ABSTRACT

A plate-like body structure for a sound insulation wall having a built-in solar battery constituted by the combination of a built-in solar battery structure having a gentle convex arcuate shape so as to be installed on the top end portion of a sound insulation wall in the form of a head piece, and a built-in solar battery structure having a built-in solar battery plate-like body held by transparent plate-like materials from its opposite sides and inserted into a window-like opening portion or a wall holding frame portion formed in the sound insulation wall.

10 Claims, 4 Drawing Sheets

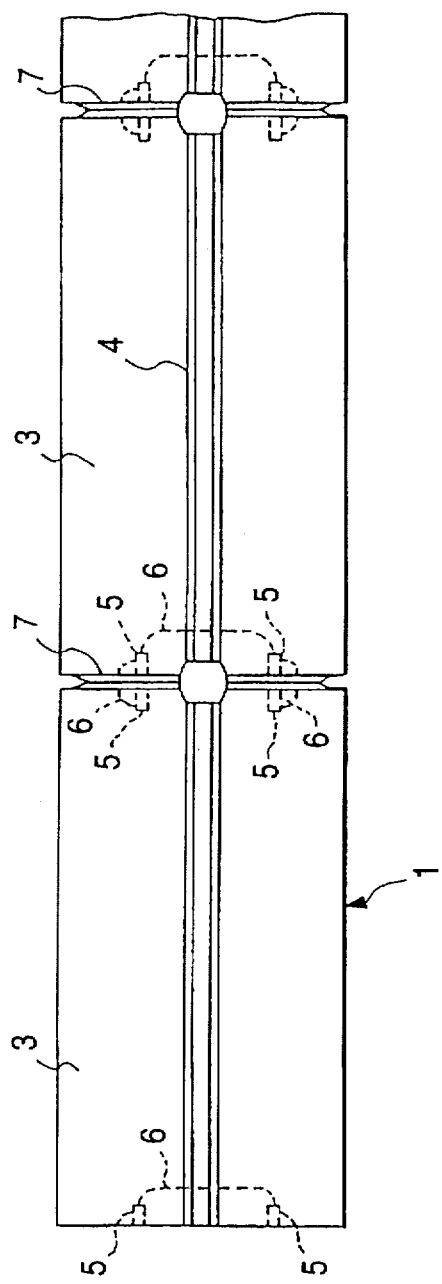
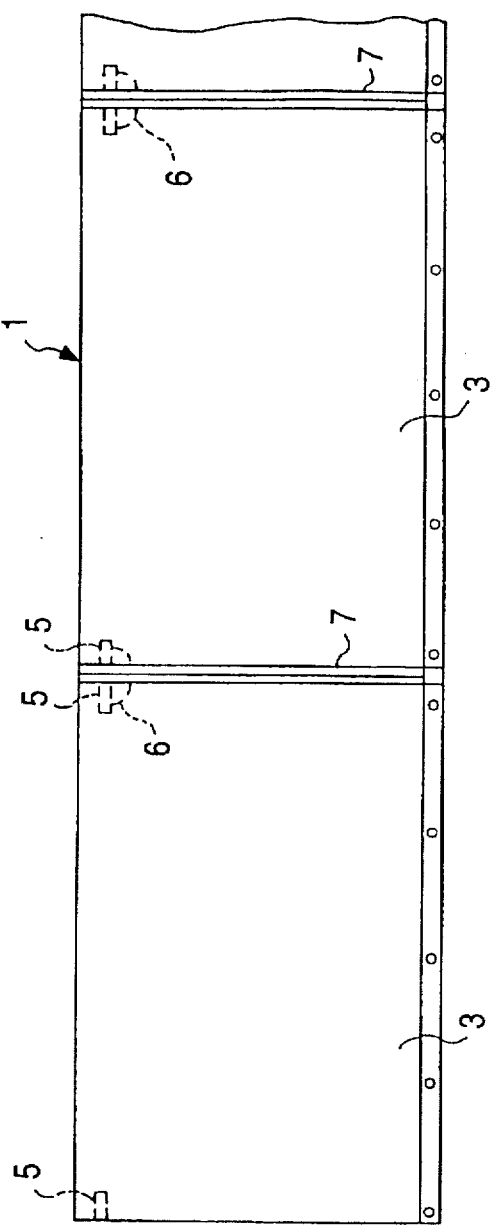
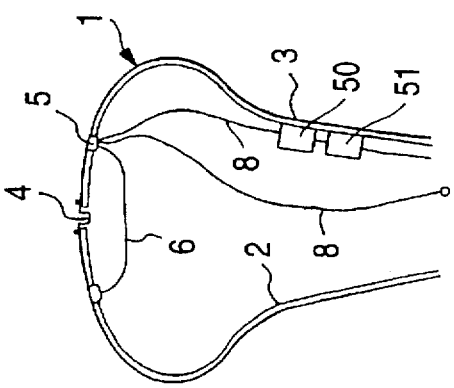

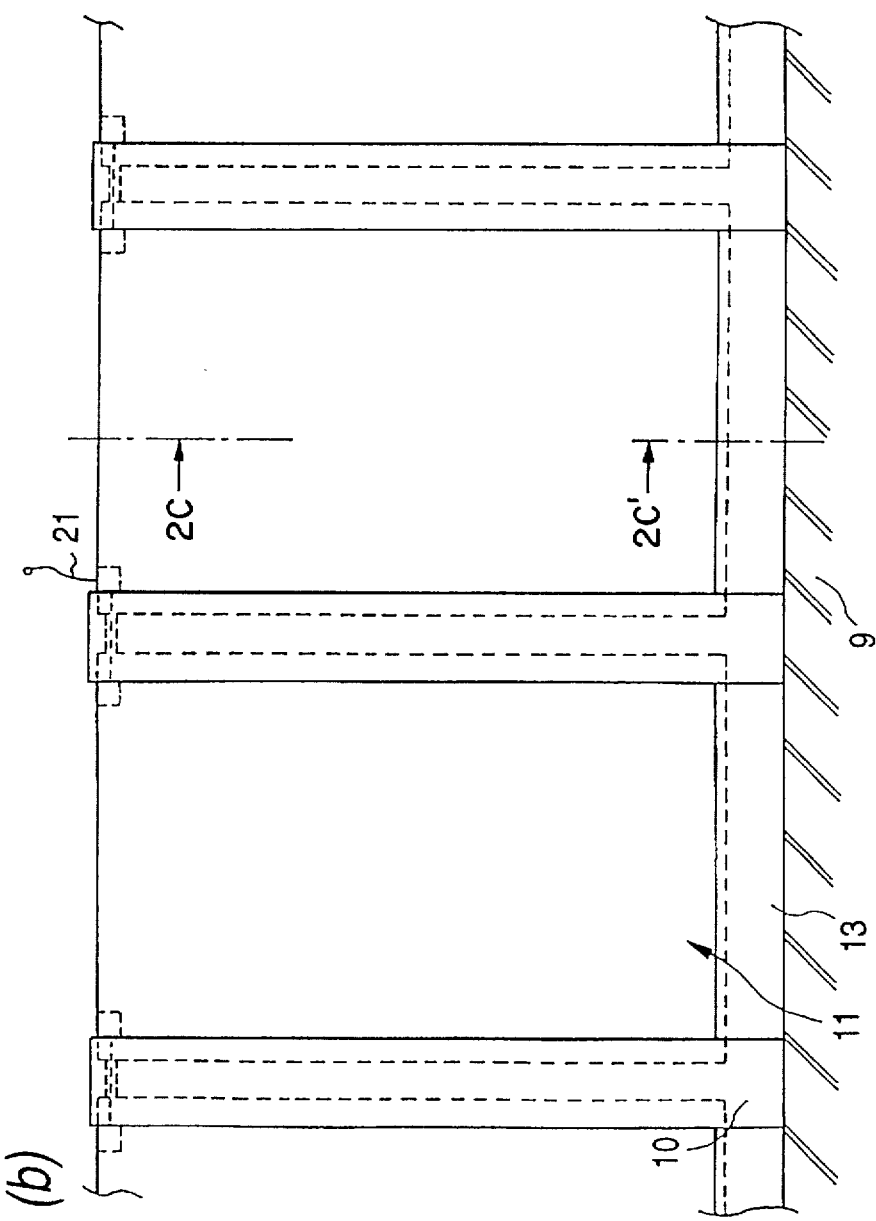

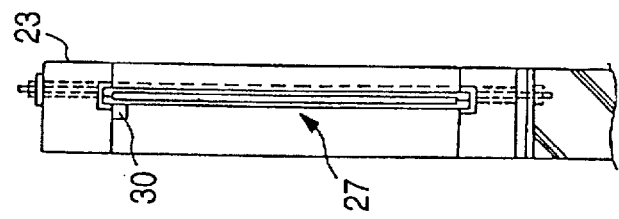
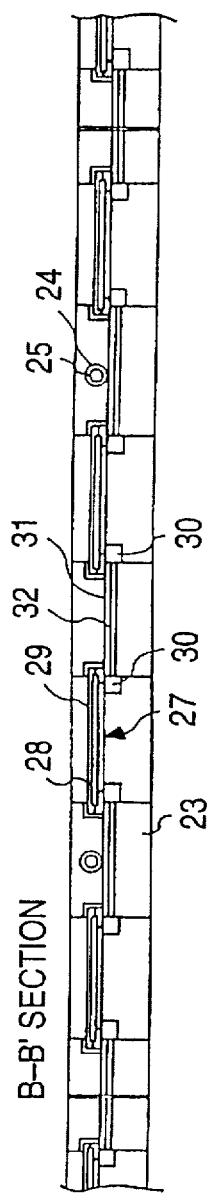
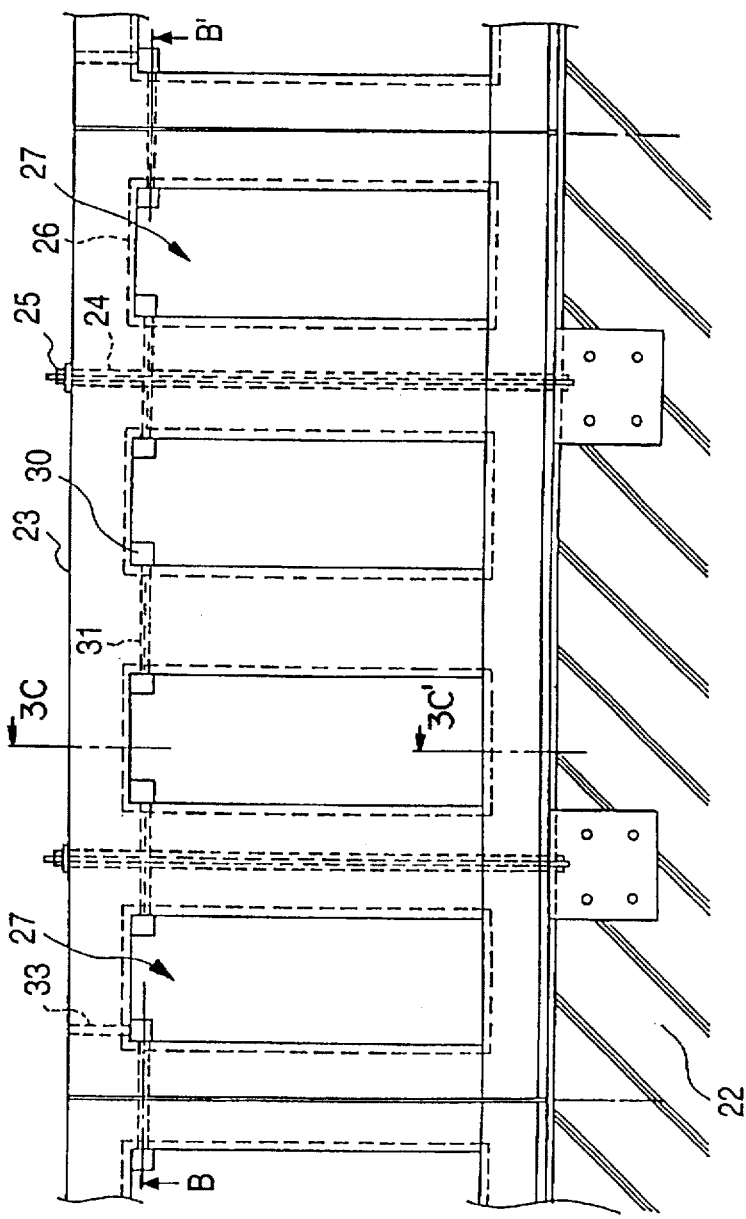

PLATE-LIKE BODY STRUCTURE WITH SOLAR BATTERY FOR SOUND INSULATION WALL

BACKGROUND OF THE INVENTION

The present invention relates to a plate-like body structure for installing a solar battery on a sound insulation wall erected at a road edge, which is intended to supply electric power to equipment on a superhighway or the like, and the area around the road.

Conventional solar batteries have been mainly composed of crystalline silicon. Various installing methods and structures have been examined in view of a basic requirement that the light receiving surface of a solar battery which is planar faces toward the direction of incident light so as to convert the light into electricity. Similarly to the above, with solar batteries applied to apparatus used in a superhighway or the like, there have been examined a method where the solar batteries are integrally bonded to a wall surface erected on the edge portion of a road, a method where solar batteries are installed obliquely on an oblique overhang provided on the wall surface, a method where a support is erected and a plate for installing the solar batteries thereon is disposed obliquely on the upper portion of the support, etc.

However, each of these methods has problems such as the conversion efficiency is poor, installation consumes extra time and labor because of the necessity to install the solar battery structure at a different location or onto the sound insulation wall after the sound insulation wall is installed, a new installation location and the installation costs associated therewith are required, and management after installation requires additional labor. Therefore, none of these methods have been used in practice.

A solar battery is a clean energy supplying source, and can be installed in any place, no matter how small or large, so long as the installation site is capable of receiving light. In addition, in the case of employing a secondary battery which is charged by the solar battery and the charged energy is then used, the solar battery becomes a stable electric energy source. On the other hand, the solar battery has problems such that the manufacturing and equipment cost is high for the generated energy in comparison with other electric energy sources, and a large installation area is required to set up the light receiving equipment, etc.

In the case where a solar battery is installed for supplying electricity to equipment on a superhighway or the like, in view of the foregoing problems, it is required that the manufacturing cost of the solar battery itself be made low, and that the light receiving equipment can be manufactured at a low price, can be installed easily without requiring any special provision, for example, by incorporating it into equipment which has been installed, etc., and can be used efficiently.

SUMMARY OF THE INVENTION

According to the present invention, a three-layer-cell-structure amorphous silicon solar battery (made by Canon Inc.) was selected as one means to solve the foregoing problems. As for the materials used for silicon solar batteries, there are three kinds: single crystal silicon, polycrystal silicon, and amorphous silicon. An amorphous silicon solar battery is advantageous in that it has flexibility in comparison with a crystalline silicon solar battery which has been mainly used, it is easy to shape and light in weight, resistant to damage such as cracking, etc. The three-layer-cell-structure amorphous silicon solar battery is further advantageous in that the resources and energy required in its manufacturing process can be reduced so that the manufacturing cost is reduced to about ⅓ compared with a crystalline silicon battery. Low conversion efficiency and photo-deterioration phenomenon which previously have been defects in an amorphous silicon solar battery are also improved greatly by the three-layer-cell-structure, and the three-layer-cell-structure amorphous silicon solar battery becomes a viable option in practice.

According to the present invention, such a three-layer-cell-structure amorphous silicon solar battery is used as a solar battery for supplying electric power to equipment on a superhighway or the like and the area around the road. The solar battery is installed integrally with a sound insulation wall erected at the edge of the road so as to form a plate-like structure with a solar battery for the sound insulation wall. As one means for forming such a plate-like structure with a solar battery for a sound insulation wall, a plate-like body is formed by bonding and shaping a flexible amorphous silicon solar battery to a plate-like material having a gentle convex arcuate portion so as to be installed on the top end portion of the sound insulation wall in the form of a head piece, and electrical connection portions are internally provided at the appropriate arcuate inside circumferential edge portions of the plate-like body so as not to project over the circumferential edge. Such plate-like structures with solar batteries for sound insulation walls are coupled by wiring with each other through their electrical connection portions so as to generate a quantity of electricity corresponding to the number of the coupled plate-like structures. In addition, wiring from the electric connection portions provides the function of incorporating circuits and apparatus such as a booster circuit or a secondary battery into the inner space surrounded by the approximately arcuate plate-like body.

As other means for forming such a plate-like structure with a solar battery for a sound insulation wall, the wall surface of the sound insulation wall itself is also effectively used as a solar battery structure. That is, two amorphous silicon solar batteries are bonded and integrally shaped so that the non-light-receiving sides thereof are made to face each other while the light receiving sides are outside, and further a pair of transparent plate-like materials are formed to hold the integrally shaped amorphous silicon solar batteries at the front and rear thereof. A plate-like body thus obtained is used so as to receive light from both the front and the rear thereof. There are two ways to use the plate-like body. In one way, the plate-like body is inserted into a wall holding frame portion formed from a steel material so as to also have a sound insulation wall function, and in the other way, a window-like opening portion is provided in the sound insulation wall, and the plate-like body is inserted into a frame groove provided in the circumferential edge of the window-like opening portion so as to also have a sound insulation wall function. In each of the two means, such plate-like bodies are coupled with each other by wiring through electrical connectors and via through-holes provided in wall holding frame portions of the sound insulation walls coupled with each other or via through-holes provided in the sound insulation walls so as to permit adjustment of the quantity of generated energy in accordance with the conditions of the installation site and the number of the coupled plate-like bodies in accordance with the required quantity of electric energy.

Further, when the plate-like structure with a solar battery for a sound insulation wall in which solar battery equipment and circuits are built in and which is to be installed on the top end portion of the sound insulation wall in the form of a head piece, is integrally installed from above and coupled with the above-mentioned plate-like structure with a solar battery for a sound insulation wall formed by inserting a plate-like body with a solar battery into a window-like opening portion provided in the sound insulation wall or a wall holding frame portion of the sound insulation wall, the entire sound insulation wall functions as a solar battery structure system.

Use of a flexible amorphous silicon solar battery enables the solar battery to be shaped and bonded to a gentle convex arcuate plate-like body which is to be installed on the top end of a sound insulation wall in the form of a head piece, so that the solar battery is used also as a sound insulation wall, the installation can be made easily, and the solar battery function can be exploited effectively.

In a plate-like structure with a solar battery for a sound insulation wall, which has a gentle convex arcuate portion and is installed on the top end portion of the sound insulation wall in the form of a head piece, electrical connectors are internally provided in circumferential edge portions so as not to project over the circumferential edges, so that when the plate-like structure is installed at a site, the electrical connection and coupling of many plate-like structures are easily made, and the structure also facilitates carrying it to a site and in prevention from damage.

A plate-like body with a solar battery inserted into a window-like opening portion formed in a sound insulation wall or a wall holding frame portion, is formed such that the light receiving sides thereof are made to face the outside and to extend over both the front and rear sides of the sound insulation wall. Thus, the efficiency of light incidence is superior. Both sides of the solar battery are held by transparent plate-like materials which are good in transparency and superior in weatherability and strength, so that the function as a sound insulation wall can also be sufficiently obtained. In addition, the plate-like body with a solar battery is insertable so that the installation is easy. Further, electrical connectors are internally provided on circumferential edge portions so as not to project over the circumferential edges, so that electrical connection becomes easy when coupling and installation of plate-like bodies are carded out at a site.

When the plate-like structure with a solar battery for a sound insulation wall in which equipment and circuits are built on the inner wall of the substrate and which is to be installed on the top end portion of the sound insulation wall in the form of a head piece, is integrally installed from above and coupled with the above-mentioned plate-like structure with a solar battery for a sound insulation wall formed by inserting a plate-like body with a solar battery into the sound insulation wall, the entire sound insulation wall can also be used as a solar battery structure system of superior efficiency.

BRIEF DESCRIPTION OF THE DRAWINGS

FIGS. 1(a), 1(b) and 1(c) are a front view, a plan view, and a side view of a first embodiment of a plate-like structure with a solar battery for a sound insulation wall according to the present invention, where the structure is installed on the top end potion of the sound insulation wall in the form of a head piece;

FIGS. 2(a), 2(b), and 2(c) are a front view, a plan view, and a sectional view of a second embodiment of the present invention, where a plate-like structure with a solar battery for a sound insulation wall is inserted into a wall holding frame potion erected at the edge of a road;

FIGS. 3(a), 3(b), and 3(c) are a front view, a plan view, and a sectional view of a third embodiment of the present invention, where a plate-like structure with a solar battery for a sound insulation wall is inserted into a window like opening portion formed in the sound insulation wall mounted on the upper surface of a base erected at the edge of a road.

DETAILED DESCRIPTION OF THE PREFERRED EMBODIMENTS

Figure 4:
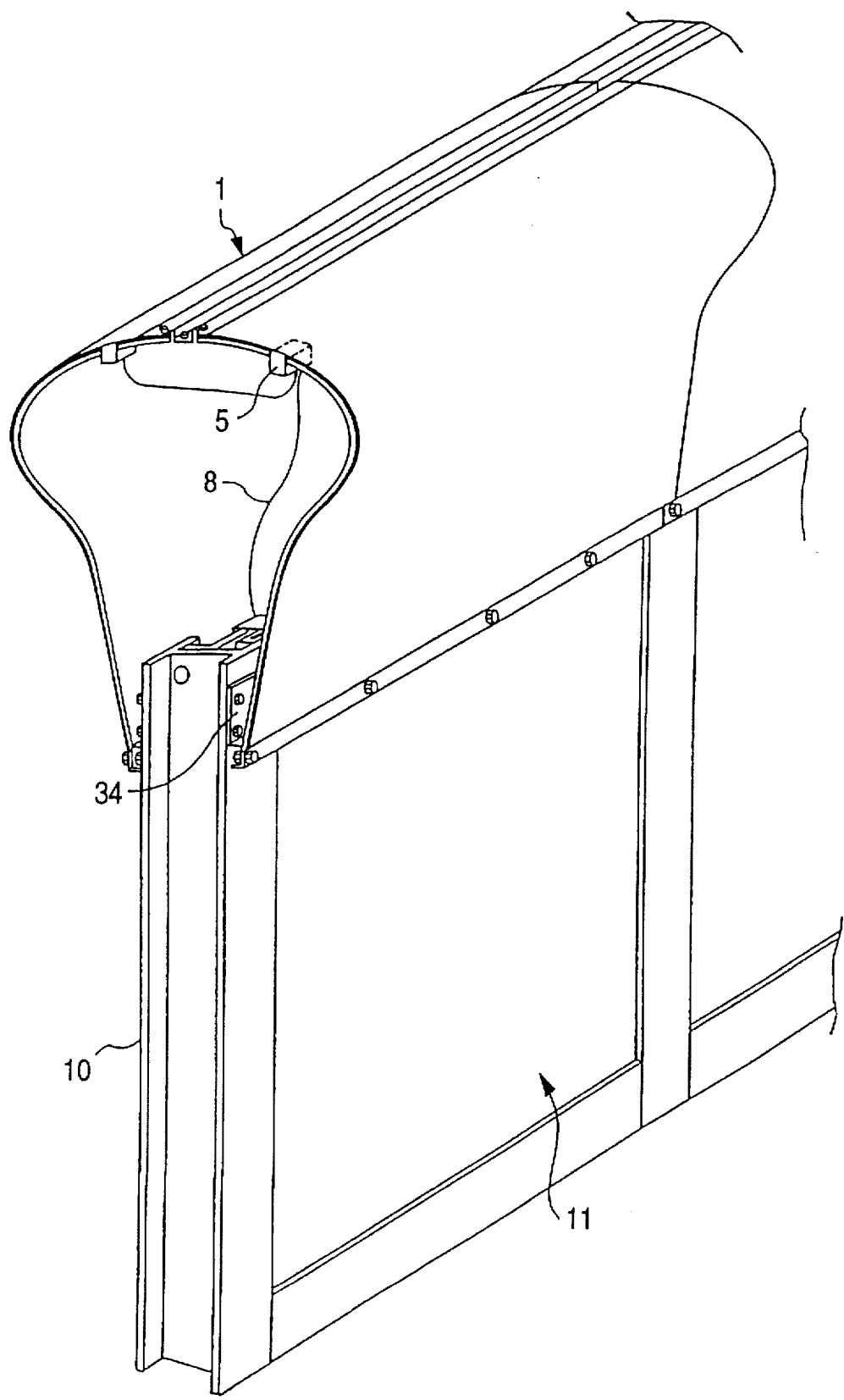
FIG. 4 is a perspective view of a fourth embodiment of the present invention, where a plate-like structure with a solar battery for a sound insulation wall has a structure obtained by combining the embodiments of FIGS. 1 and 2.

Preferred embodiments of the present invention will be described below with reference to the drawings.

FIGS. 1(a), 1(b), and 1(c) are a front view, a plan view, and a side view of a plate-like structure with a solar battery for a sound insulation wall, in which the structure is installed on the top end potion of the sound insulation wall in the form of a head piece.

In FIGS. 1(a)–1(c), a plate-like body with a built-in solar battery 1 is formed in such a manner that a substrate 2 formed from a hard plate-like material such as a steel plate or the like having a gentle convex arcuate potion, and a flexible amorphous silicon solar battery 3 are bonded and shaped with each other so that the solar battery 3 is made to cover the outer surface of the substrate 2. In this embodiment, in order to easily install the plate-like body 1 onto a top end portion of a sound insulation wall, and in order to carry the plate like body 1 onto a site without it being unwieldy, the top end portion of the plate-like body 1 is halved at its center, and the two halves of the plate-like body 1 are connected to each other at their top end connection portions 4. However, the plate-like body 1 may be shaped into an integrated form without providing any top end connection portions 4. Although the halved portions of the plate-like body 1 are symmetrically connected with each other with respective to the top end connection portions 4, the shape is not limited to this, and there are no problems provided the plate-like body 1 has a gentle convex arcuate portion having, for example, a semicircular section, a semielliptic section, or the like, so that a flexible amorphous silicon solar battery can adhere thereto. Although the amorphous silicon solar battery 3 is made to adhere to basically the whole surface of the substrate 2, it may be made to adhere not to the whole surface but partially thereto as desired, with non-adherent portions left as they are, or in some cases, the solar battery 3 may be covered with a transparent material such as an acrylic sheet or the like. Further, the plate-like body 1 with built-in solar battery can be coupled with another one through coupling connection portions 7, and may be coupled with further ones in accordance with the conditions of the installation site and the required quantity of electric energy.

Electrical connectors 5 are connected to the amorphous silicon solar battery 3 at the circumferential edge portions of the plate-like body 1 through holes provided in the substrate 2 so that the electrical connectors 5 do not project over the circumferential edges of the plate-like body 1. In addition, such electrical connectors 5 are provided in pairs, one at the fight and the other one at the left, at the side of the coupling connection portions 7 on the circumferential edge portion of the plate-like body 1. The halves of each of the plate-like bodies 1 opposite to each other are connected to each other by respective wiring 6 through the electrical connectors 5, and the pairs of plate-like bodies 1 are connected to each other at the coupling connection portions 7 by respective wiring 6 through their electrical connectors 5 so that electricity generated in the respective solar batteries can be outputted. The electrical connectors 5 may be integrated with the wiring 6 so that the integrated connectors along with the wiring can be removably attached to the plate-like bodies 1. In addition, as shown in FIG. 1(c), devices and/or circuits such as a booster circuit 50 or a secondary battery 51 can be provided through wiring 8 extending from the electrical connectors 5 according to need. It thus it is not necessary to put such additional devices and/or circuits into a separate enclosure so as to be protected from wind and rain, nor is it necessary to provide any other special place for installation, but they can be installed on the substrate 2 as they are, by use of the inner space formed by the plate-like body 1.

FIGS. 2(a)–2(c) show a second embodiment in which a plate-like body having a built-in solar battery 11 is inserted into a wall holding frame portion 10 made of steel and erected at the edge of a road 9 such as a superhighway or the like so as to also function as a sound insulation wall. As for the method of installation, the right and left edge portions of the plate-like body 11 are sandwiched along the entire length of their vertical edges between packing 12 for holding, damping, and absorbing thermal expansion, inserted into the wall holding frame body 10 from above so as to be received by a lower frame portion 13, further held by bracket 14, and then fixed by means of a nut and bolt 15.

The thus inserted plate-like body 11 has been formed in advance in such a shape that an amorphous silicon solar battery 16 is held by a pair of transparent plate-like materials 17 from its front and back surfaces before the plate-like body 11 is inserted, and two electric connection portions 18 are provided, that is, one on the right side of the upper portion and the other on the left side of the upper portion. Although two amorphous silicon solar batteries 16 are used in combination with their light receiving sides facing outwardly, only one amorphous silicon solar battery 16 may be used with its light receiving side facing in only one direction, in accordance with need. As the transparent materials 17, any plate-like material may be used so long as it has sufficient strength and transparency as a wall body. In this embodiment, however, methacrylic resin plates, which are particularly superior in transparency, optical characteristics, weatherability and surface hardness, are used.

The inserted plate-like body 11 is electrically coupled with other adjacent plate-like bodies 11 through wirings 19 extending from its electrical connectors 18 to the electric connection portions 18 of the latter, via through-holes 20 provided in the wall holding frame portions 10. Each electrical connector 18 may be integrated with its wiring 19 so that the electrical connector 18, along with its wiring 19 may be removably attached to the plate-like body 11. By successively coupling plate-like bodies 11 with each other through wiring 19, the quantity of generated electric energy may be adjusted in accordance with the conditions of the installation site and required quantity of electric energy. In addition, other solar batteries and/or apparatus and circuits such as a booster and a secondary battery may be incorporated on the wiring extensions 21 connected to and led out from the electrical connectors 18, in accordance with need. In FIGS. 3(a)–3(c), a square concrete sound insulation wall 23 is mounted on the upper portion of a concrete balustrade 22 as a base erected at the edge of a superhighway or the like. The balustrade 22 and the concrete sound insulation wall 23 are fixed with each other by a bar 25 inserted into a vertical through hole 24. Further, a window-like opening portion which is rectangular and extended in the vertical direction is provided in the vertical surface of the concrete sound insulation wall 23, and a frame groove 26 is provided in the circumferential edge of the window-like opening portion.

The plate-like body having a built-in solar battery 27 has an amorphous silicon solar battery 28 held by a pair of transparent plate-like materials 29 on its front and back surfaces and electrical connectors 30 are provided in pairs, that is, one on the right side of the upper portion and the other on the left side of the upper portion. Although two amorphous silicon solar batteries 16 are used in combination with their light receiving sides facing outwardly, only one amorphous silicon solar battery 16 may be used with its light receiving side facing only one direction, in accordance with need. As the transparent plate-like materials 29, any plate-like material may be used so long as it has sufficient strength and transparency as a wall body. In this embodiment, however, methacrylic resin plates, which are particularly superior in transparency, optical characteristics, weatherability, and surface hardness, are used.

The plate-like body 27 is inserted into the frame groove 26 provided in the circumferential edge of a window-like opening portion of the concrete sound insulation wall 23. The plate-like body 27 is electrically coupled with other adjacent plate-like bodies 27 through wirings 32 which are connected between an electrical connector 30 of the former and the respective electrical connectors 30 of the latter, via through-holes 31 provided horizontally in the concrete sound insulation wall 23. Each electrical connector 30 may be integrated with its wiring 32 so that the electrical connector 30, along with its wiring 32, may be removably attached to the plate-like body 27. By successively coupling plate-like bodies 27 with each other through wirings 32, the quantity of generated electric energy may be adjusted in accordance with the conditions of the installation site and required quantity of electric energy. In addition, through holes 33 are provided in suitable places upper edge of the concrete sound insulation wall 23, so that another solar battery and/or apparatus and circuits such as a booster and a secondary battery may be incorporated on the extension of a wire connected to the electrical connector 30. In addition, sealing material, packing, etc. may be inserted into any gaps between the inserted plate-like body 27 and the frame groove 26 to thereby prevent rainwater from entering the gaps, or to thereby hold the plate-like body 27 in place.

FIG. 4 shows a fourth embodiment of a structure in which the respective embodiments of FIGS. 1 and 2 are combined. In this embodiment, there are provided both the sound insulation wall structure in which the plate-like body 11 having a built-in solar battery is inserted into the wall holding frame portion 10 erected at the edge of a road 9 such as a superhighway or the like and made from a steel material so as to also provide a function of a sound insulation wall as shown in FIG. 2, and the structure in which the plate-like body 1 having a gentle convex arcuate portion and divided at the center of the top end portion is installed on the upper portion thereof. The two structures are fixed with each other by bolts through a connecting bracket 34 in the lower end portion of the plate-like body 1 and in the upper end portion of the wall holding frame portion 10. The wiring 8 from the electrical connector 5 of the solar-battery of plate-like body 1 is connected to the electrical connector 18 of the solar battery of plate-like body 11 so that the plate-like bodies 1 and 11 are electrically coupled with each other.

In the same manner as the embodiment in FIG. 4, the lower end portion of the plate-like body 1 in FIG. 1 installed on the upper portion may be fixed by means of screws to the upper end portion of the concrete sound insulation wall 23 shown in FIG. 3 through a connection bracket 34 so that the two plate-like bodies 1 and 27 are integrated with each other. Also in this case, the wiring 8 from the electrical connector portion 5 of the plate-like body 1 is connected to the electrical connector 30 of the plate-like body 27 via the through hole 33 of the concrete sound insulation wall 23 so that the plate-like bodies 1 and 27 are electrically coupled with each other.

According to the present invention, a solar battery structure having a high conversion efficiency can be integrated with a sound insulation wall at a site having suitable solar battery installation conditions, such as the edge of a superhighway or the like, without requiring a new installation site. Accordingly, as a built-in solar battery structure for a sound insulation wall, the manufacturing cost and the installation cost can be greatly reduced. As for the installation, the respective solar batteries are integrated for a sound insulation wall, electrical devices and/or circuits are internally provided, and the solar batteries are easily and removably connected through electrical connectors, so that the installation at the site can be easily performed and in a short time. In addition, as for the maintenance thereof after the installation, the structure can be maintained together with the sound insulation wall, so that examination can be performed easily and labor for maintenance can be reduced. In addition, before the installation, the structure is shaped and prepared in advance in a factory in a form which is suitable for transportation as a built-in solar battery plate-like structure for a sound insulation wall, so that it can be removed and replaced easily when a fault or damage arises. Further, during cleaning, the entire sound insulation wall including the solar batteries portion can be cleaned integrally and efficiently on the basis of the usual way of cleaning the sound insulation wall.

In the case where the equipment to which the solar-battery-built-in sound insulation wall structures are coupled with each are used as a multi-purpose electric power supply system, electricity can be easily supplied through wiring, so that the equipment can be used not only for a superhighway or the like but also for supplying electric power to the area in the vicinity of the superhighway. In addition, this built-in solar battery sound insulation wall structure equipment can also be applied as a sound insulation wall for a high-speed railroad, a factory, or the like where loud noise is generated.

What is claimed is:

1. A sound insulation wall with a built-in solar battery, comprising:

a first type plate-like body having a gently curved, convex arcuate portion, and a flexible amorphous silicon solar battery disposed on said arcuate portion, said first type plate-like body being mounted on a top end portion of a sound insulation wall; and at least one electrical connector provided in a circumferential edge portion of said first type plate-like body so as not to project over said circumferential edge.

2. A sound insulation wall according to claim 1, wherein a plurality of said first type plate-like bodies are mounted side-by-side on the top end portion of the sound insulation wall, said first type plate-like bodies being electrically connected with each other through their respective electrical connectors.

3. A sound insulation wall according to claim 1, further comprising a booster circuit which is provided in a space formed within said first type plate-like body and is connected to said electrical connector.

4. A sound insulation wall according to claim 1, further comprising a secondary battery which is provided in a space formed within said first type plate-like body and is connected to said electrical connector.

5. A sound insulation wall according to claim 1, further comprising a second type plate-like body and at least one electrical connector provided in a circumferential edge portion of said second type plate-like body so as not to project over said circumferential edge, wherein said second type plate-like body includes two amorphous silicon solar batteries bonded integrally with each other with their non-light-receiving sides facing each other, and a pair of transparent plate-like materials disposed on both exposed sides of said integrally bonded amorphous silicon solar batteries so as to hold said solar batteries therebetween, said second type plate-like body being inserted into a wall holding frame portion of the sound insulation wall and disposed under said first type plate-like body, and wherein said first type plate-like body and said second type plate-like body are electrically connected to each other through their respective said electrical connectors.

6. A sound insulation wall according to claim 1, further comprising a second type plate-like body and at least one electrical connector in a circumferential edge portion of said second type plate-like body so as not to project over said circumferential edge, wherein said second type plate-like body includes two amorphous silicon solar batteries bonded integrally with each other with their non-light-receiving sides facing each other, and a pair of transparent plate-like materials disposed on the exposed on the exposed sides of said integrally bonded amorphous silicon solar batteries so as to hold said solar batteries therebetween, said second type plate-like body being inserted into a window-like opening portion formed in the sound insulation wall and disposed under said first type plate-like body, and wherein said first type plate-like body and said second type plate-like body are electrically connected to each other via their respective said electrical connectors and through holes provided in the sound insulation wall.

7. A sound insulation wall with a built-in solar battery, comprising:

a plate-like body including two amorphous silicon solar batteries bonded integrally with each other with their non-light-receiving sides facing each other, and a pair of transparent plate-like materials disposed on both exposed sides of said integrally bonded amorphous silicon solar batteries so as to hold said solar batteries therebetween, said plate-like body being inserted into a wall holding frame portion of a sound insulation wall; and at least one electrical connector provided in a circumferential edge portion of said plate-like body so as not to project over said circumferential edge.

8. A sound insulation wall according to claim 6, wherein a plurality of said plate-like bodies are provided side-by-side, said plate-like bodies being electrically connected to each other via their respective electrical connectors and through-holes provided in said wall holding frame portion.

9. A sound insulation wall with a built-in solar battery, comprising:

a plate-like body including two amorphous silicon solar batteries bonded integrally with each other with their non-light-receiving sides facing each other, and a pair of transparent plate-like materials disposed on both exposed sides of said integrally bonded amorphous silicon solar batteries so as to hold said solar batteries therebetween, said plate-like body being inserted into a window-like opening portion formed in a sound insulation wall; and at least one electrical connector provided in a circumferential edge portion of said plate-like body so as not to project over said circumferential edge.

10. A sound insulation wall according to claim 7, wherein a plurality of said plate-like bodies are provided side-by-side, said plate-like bodies being electrically connected to each other via their respective electrical connectors and through-holes provided in the sound insulation wall.

* * * * *